(12) United States Patent
Ehrlich

(10) Patent No.: US 8,562,019 B2
(45) Date of Patent: Oct. 22, 2013

(54) BUMPER BLOCK ASSEMBLY FOR A REAR BUMPER OF A TRAILER

(71) Applicant: Rodney P. Ehrlich, Monticello, IN (US)

(72) Inventor: Rodney P. Ehrlich, Monticello, IN (US)

(73) Assignee: Wabash National, L.P.

( * ) Notice: Subject to any disclaimer, the term of this patent is extended or adjusted under 35 U.S.C. 154(b) by 0 days.

(21) Appl. No.: 13/623,295

(22) Filed: Sep. 20, 2012

(65) Prior Publication Data
US 2013/0106087 A1 May 2, 2013

Related U.S. Application Data

(60) Provisional application No. 61/553,430, filed on Oct. 31, 2011.

(51) Int. Cl.
*B60J 11/00* (2006.01)
(52) U.S. Cl.
USPC ............................. 280/770; 188/371; 188/377
(58) Field of Classification Search
USPC .................. 188/371, 377; 280/770; 52/173.2; 248/526, 560, 636
See application file for complete search history.

(56) References Cited

U.S. PATENT DOCUMENTS

| | | | | |
|---|---|---|---|---|
| 3,841,683 A | * | 10/1974 | Toro | 293/107 |
| 7,584,943 B2 | * | 9/2009 | DiBiase | 267/140 |
| 2007/0151819 A1 | | 7/2007 | Schmidt et al. | |

* cited by examiner

*Primary Examiner* — John Walters
*Assistant Examiner* — James Triggs

(57) ABSTRACT

A bumper block assembly configured to be coupled to a bumper of a trailer includes a compressible bumper block including a generally horizontal bore extending from an outer surface of the bumper block to an inner surface of the bumper block and an outer cap coupled to the bumper block. The outer cap includes an outer wall engaged with the outer surface of the bumper block and further includes an aperture formed therethrough that is aligned with the bore of the bumper block. A bolt of the bumper block assembly is received through the aperture of the outer cap and the bore of the bumper block in order to couple the bumper block assembly to the bumper of the trailer. A spring of the assembly is positioned around a threaded end portion of the bolt in order to maintain the bolt recessed within the aperture of the outer cap as the outer cap and bumper block are moved between expanded and compressed positions.

13 Claims, 3 Drawing Sheets

BUMPER BLOCK ASSEMBLY FOR A REAR BUMPER OF A TRAILER

This application claims priority under 35 U.S.C. §119(e) to U.S. Provisional Patent Application Ser. No. 61/553,430 filed Oct. 31, 2011 entitled BUMPER BLOCK ASSEMBLY FOR A REAR BUMPER OF A TRAILER, the entirety of which is hereby incorporated by reference herein.

FIELD OF THE INVENTION

The present invention relates generally bumper blocks for the rear bumper of a vehicle, such as a semi-trailer, for example.

BACKGROUND

Vehicles such as semi-trailers or flat-bed trailers, for example, oftentimes include shock-absorbing bumper blocks coupled to the rear bumper of the vehicle. Such bumper blocks operate to protect the bumper of the vehicle as the vehicle is backed into a dock in order to load or unload cargo from within the vehicle. The bumper blocks also operate to protect the face of the building from vehicle impact as the vehicle is backed into the dock.

Bumper blocks are typically made of a molded polymer such as rubber. The rubber may also be reinforced with a laminated fabric. Bumper blocks coupled to the rear bumper of a vehicle must operate to absorb the impact of the vehicle backing into the dock. Such bumper blocks must also withstand vertical friction caused by weight being added and removed from the vehicle, such as the storage container of a trailer as the trailer is being loaded or unloaded at the dock, for example. In particular, when a forklift drives onto or off of the storage container of the trailer, the trailer's suspension allows the storage container to rise and fall accordingly. The resulting friction between the face of the dock and the face of the bumper block of the trailer may operate to wear out the bumper block. Accordingly, such shock-absorbing bumper blocks oftentimes are in need of frequent replacement due to the impacting and continuous vertical dock rubbing that may degrade a conventional rubber dock bumpers

SUMMARY

The present invention may comprise one or more of the features recited in the attached claims, and/or one or more of the following features and combinations thereof.

According to one aspect of the present disclosure, a bumper block assembly configured to be coupled to a bumper or underride assembly of a trailer comprising a compressible bumper block or spring assembly configured to be coupled to the bumper of the trailer. The bumper block includes a generally horizontal bore extending from an outer surface of the bumper block to an inner surface of the bumper block. The assembly further includes an outer cap coupled to the bumper block. The outer cap includes an outer wall engaged with the outer surface of the bumper block and further includes an aperture formed therethrough that is aligned with the bore of the bumper block. A fastener of the bumper block assembly is received through the aperture of the outer cap and the bore of the bumper block, and a spring of the assembly is positioned around an end portion of the fastener in order to maintain the fastener recessed within the aperture of the outer cap as the outer cap and bumper block are moved between expanded and compressed positions.

In one illustrative embodiment, the fastener may be configured to be received through an aperture in the bumper of the trailer.

In another illustrative embodiment, the entire spring may be positioned forward of the bumper block. Further, the spring may be spaced-apart from the outer cap.

In still another illustrative embodiment, the outer surface of the outer wall may be curved outwardly.

In yet another illustrative embodiment, the outer cap may also include a top wall, a bottom wall, and spaced-apart side walls each coupled to the outer wall in order to define a bumper block-receiving cavity therein. Further, a portion of the bumper block may be received within the cavity. Illustratively, the bumper block may be engaged with the top, bottom, and side walls of the outer cap. Further illustratively, the spring may be positioned outside the bumper-receiving cavity.

In still another illustrative embodiment, a distance between first and second ends of the spring may be greater when the outer cap and the bumper block are in the compressed position than when the outer cap and the bumper block are in the expanded position.

In yet another illustrative embodiment, the bumper block assembly may further include an outer frame configured to be coupled to the bumper of the trailer in order to guide movement of the outer cap between compressed and expanded positions of the bumper block. Illustratively, the outer frame may include top, bottom, and side walls each configured to be coupled to the bumper of the trailer and each engaged with the corresponding top, bottom, and side walls of the outer cap.

In still another illustrative embodiment, the bumper block assembly may also include a spacer positioned around an end portion of the fastener. Illustratively, the spring may be positioned around the spacer. Further illustratively, a rearward end of the spacer may be configured to engage a forward surface of the bumper and a forward end of the spacer may be engaged with a spring hub coupled to the end of the fastener.

According to another aspect of the present disclosure, a rear bumper of a vehicle such as a trailer comprises a horizontal member and a bumper block assembly coupled to the horizontal member. The bumper block assembly includes a compressible bumper block engaged with a rearward surface of the horizontal member and an outer cap engaged with a rearward surface of the bumper block when the bumper block is in both compressed and expanded positions. Illustratively, the outer surface of the outer cap is curved outwardly. The bumper block assembly further includes a fastener received through the outer wall, the bumper bock, and the horizontal wall of the bumper, and a spring positioned around the fastener such that a first end of the spring is engaged with the forward surface of the horizontal member of the bumper and a second end of the spring is engaged with spring hub on a second end of the fastener positioned forward of the horizontal member of the bumper.

In one illustrative embodiment, the outer cap may include a recess formed therein, and a head of the fastener may be positioned within the recess.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles which may include such bumper block assemblies in order to protect a rear bumper or other portion of the vehicle as the vehicle is backed into a dock, for example. In particular, the concepts of this disclosure are applicable to refrigerated and dry van trailers as well as flat bed trailers and other truck bodies, for example. Accordingly, those skilled in the art will appreciate that the present invention may be implemented in a number of different applications and embodiments and is not specifically limited in its application to the particular embodiments depicted herein.

Figure 1:
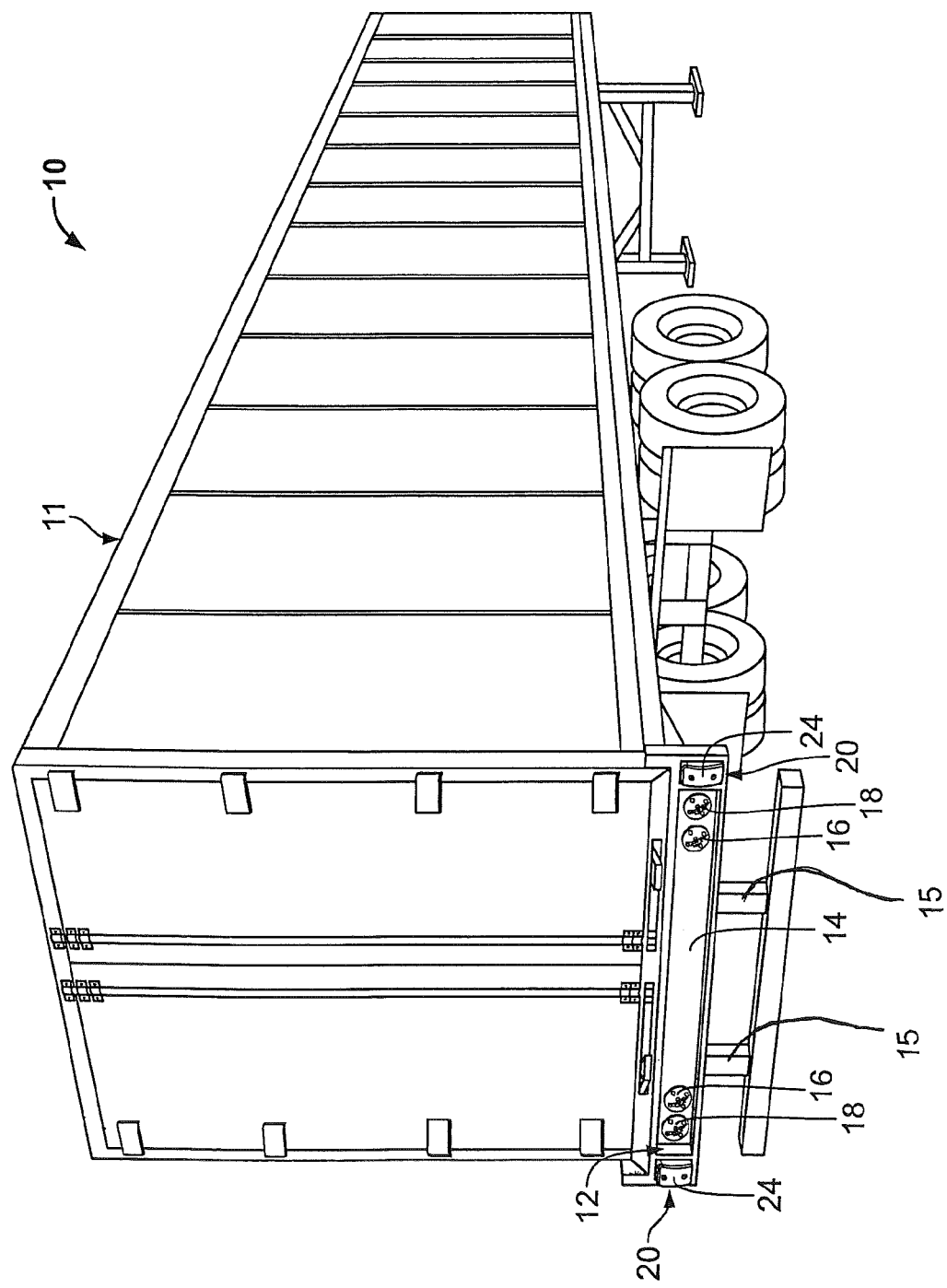
FIG. 1 is a perspective view of a portion of a rear bumper of a trailer including a bumper block assembly of the present disclosure at each side end of the bumper.
Figure 2:
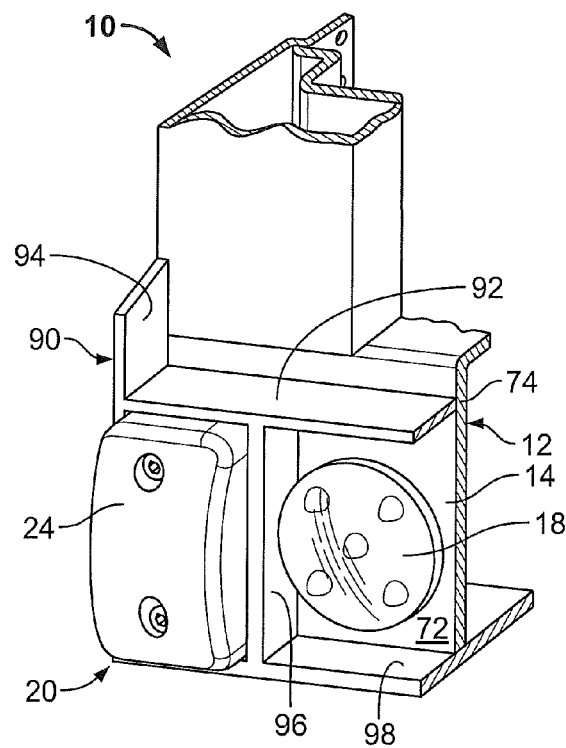
FIG. 2 is a perspective view of one of the bumper block assemblies on the trailer.
Figure 3:
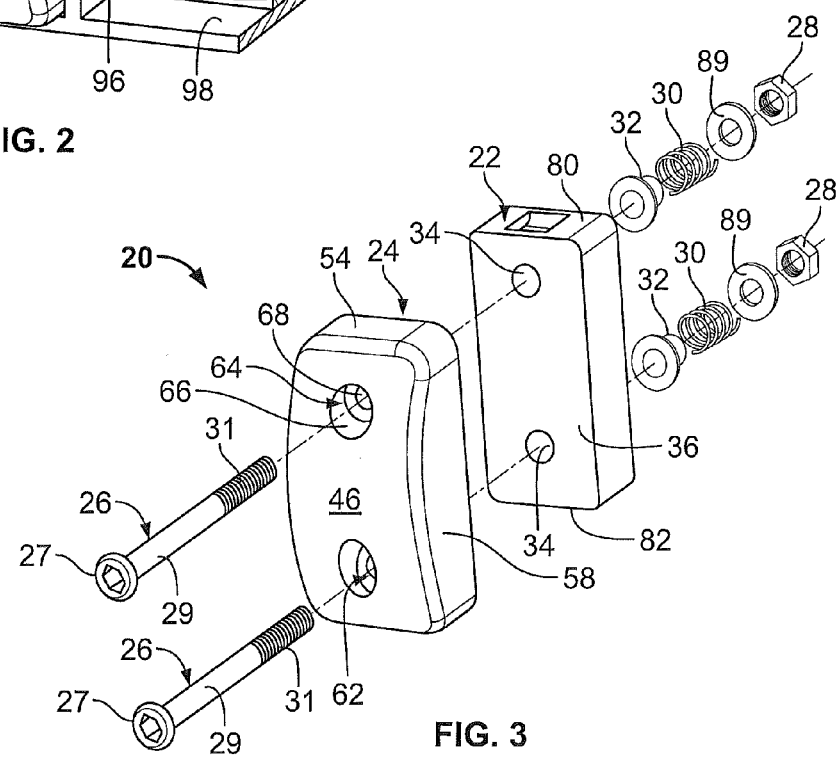
FIG. 3 is an exploded, perspective view of the bumper block assembly shown in FIGS. 1 and 2.

An illustrative trailer 10 includes a storage container 11 having a rear bumper 12. The rear bumper 12 includes a horizontally-extending member or sill 14 as well as brake lights 16 and turn signal lights 18 coupled to the sill 14 and located generally on each of the right and left sides of the bumper 12. Of course, other lights may be provided as well. The illustrative trailer 10 further includes a bumper block assembly 20 coupled to the horizontally-extending sill 14 at the outer-most ends (i.e., right and left sides) of the bumper 12, as shown in FIG. 1. It should be understood that while the bumper block assemblies 20 are each positioned on the outer ends of the bumper 12 0outside the lights 16, 18, the bumper block assemblies 20 may also be coupled to other portions of the trailer 10. For example, a bumper block assembly may be coupled to the bumper 12 inboard of the lights 16, 18 and/or may be coupled to one or more of the vertical legs 15 of the rear underride assembly.

As is discussed in greater detail below, each bumper block assembly 20 operates to absorb rearward impacts of the trailer 10 as the trailer 10 impacts a dock, for example. In particular, the bumper block assemblies 20 operate to protect the bumper 12 of the trailer 10 as the trailer 10 is being docked as well as when the trailer is being loaded and unloaded at the dock. As is discussed in greater detail below, an outer cap 24 of each bumper block assembly 20 further operates to protect a shock-absorbing bumper block 22 of each respective assembly 20 from the wear and tear associated with the impact on the bumper block assemblies 20 during docking and loading and unloading of cargo within the storage container 11 of the trailer.

As shown in FIGS. 1-5, each bumper block assembly 20 includes the outer cap 24, the inner shock-absorbing bumper block 22, a pair of nuts and bolts 26, 28 in order to couple the cap 24 and the block 22 to the sill 14 of the rear bumper 12, a pair of springs 30, an a corresponding pair of spacers 32. Illustratively, the bumper block 22 is generally rectangular in shape and is made of a molded polymer such as rubber such that the bumper block 22 is resiliently-compressible. However, it should be understood that the bumper block 22 may be made from other resiliently-compressible materials that operate to absorb some of the force of the impact of the trailer 10 against a dock (not shown), for example. In other words, other suitable shock-absorbing materials may be used as well. Furthermore, in place of the rubber block, other suitable dampening, or shock-absorbing, components, such as, for example, a spring assembly including one or more compressible steel springs, may be used as well.

Figure 4:
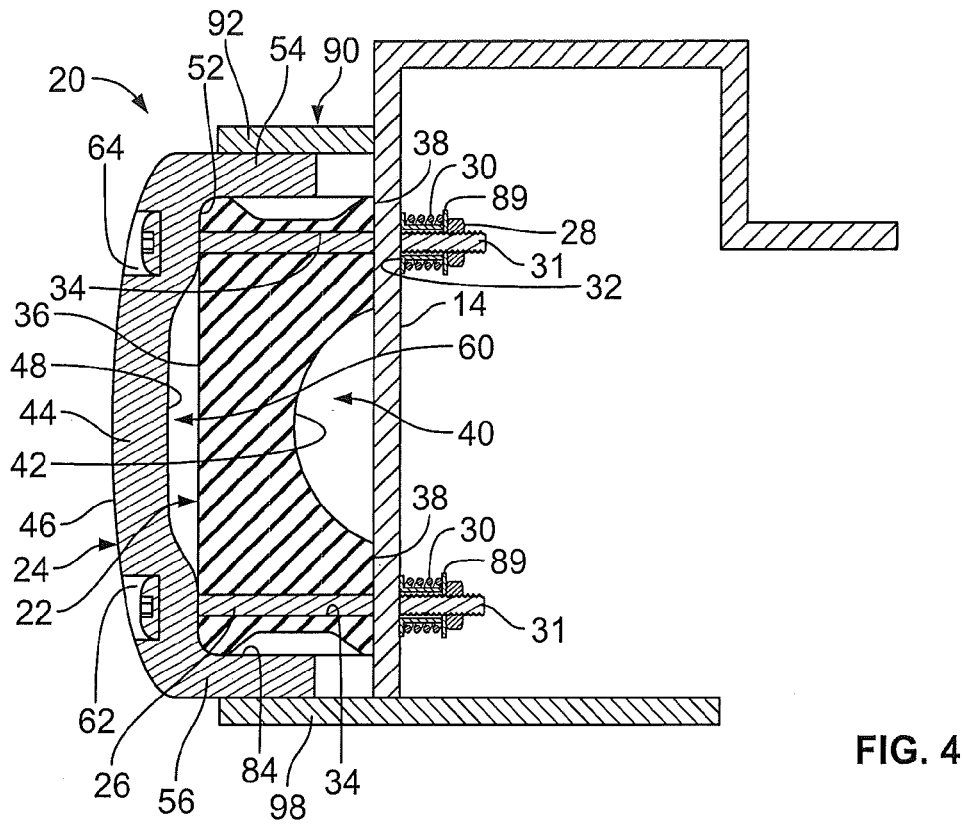
FIG. 4 is a sectional view of the bumper block assembly shown in FIGS. 1-3 showing the bumper block assembly in an extended, or uncompressed, position.
Figure 5:
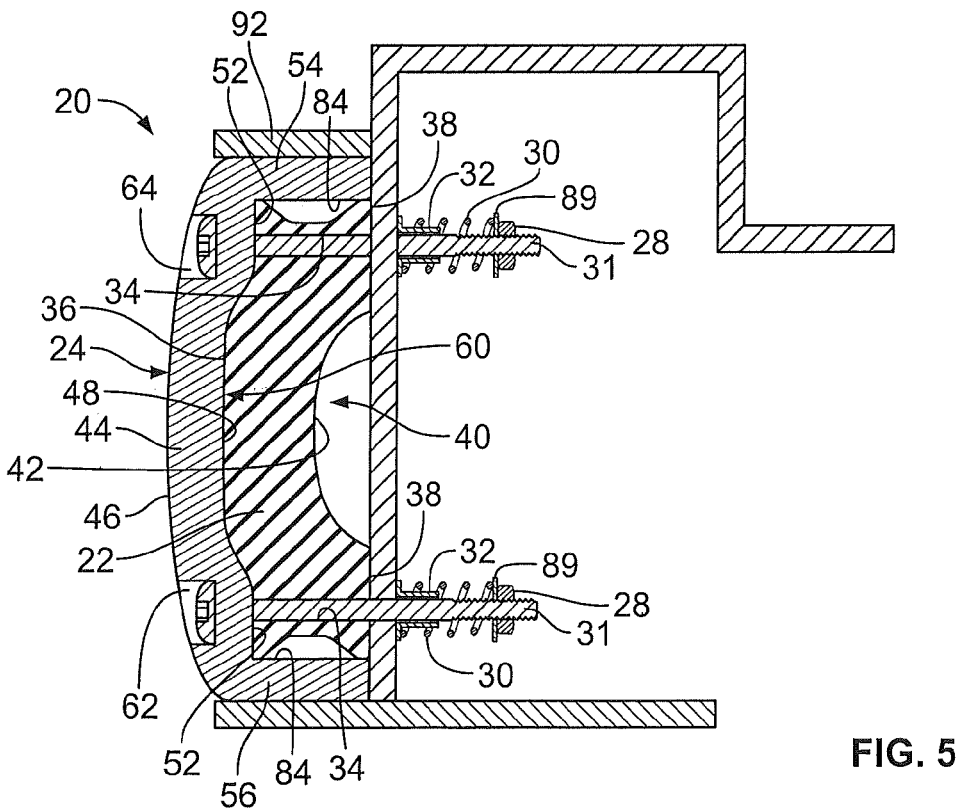
FIG. 5 is a sectional view similar to FIG. 4 showing the bumper block assembly in a compressed position.

As shown in FIGS. 4 and 5, the bumper block 22 includes first and second bores 34 which each extend from an outer, rearward surface 36 of the bumper block 22 to an inner, forward surface 38 of the bumper block 22. Illustratively, the bumper bock 22 includes a cut-out portion 40 formed in the inner surface 38 to define a rear, curved surface 42. The illustrative cut-out portion 40 of the bumper block 22 allows the bumper block 22 to deform while being compressed within the confines of the space provided, as shown in FIG. 5. In use, as is discussed in greater detail below, as the trailer 10 is backed into the dock such that the bumper block 22 is compressed against the dock, the cut-out portion 40 of the bumper block 22 operates to prevent the bumper block 22 from bulging outward and pressing against an inner surface of the outer cap 24. It should be understood that while the particular illustrative cut-out portion 40 is provided, the bumper block 22 may be provided with other suitable cut-out portions of other suitable shapes and sizes. The bumper block 22 may also be provided with cavities formed within the body of the bumper block 22 in order to allow the bumper block 22 to bulge into these cavities during compression. Accordingly, as the bumper block 22 is compressed when the trailer 10 is backing into the dock, the internal cavities may operate to reduce the extent to which the bumper block 22 bulges under compression. Further, the bumper block 22 may be provided without a cut-out portion and the bumper block assembly 20 may be provided with an area or space to allow the bumper block 22 to deform into while being compressed.

Illustratively, the bores 34 formed in the bumper block 22 are vertically spaced-apart from each other. However, it should be understood that the bores 34 may be positioned in any suitable location through the bumper block 22. Further, while the bumper block 22 includes two bores 34 formed therein, it is within the scope of this disclosure for the bumper block 22 to include only one bore or any number of multiple bores formed therein.

Similar to the bumper block 22, the outer cap 24 of the bumper block assembly 20 is also generally rectangular in shape and is provided to cover the outer surface 36 of the bumper block 22. As is discussed in greater detail below, the outer cap 24 operates to provide increased wear resistance to the bumper block 22, and also operates to reduce any sliding friction between the bumper block 22 and the dock. Thus, the outer cap 24 protects the bumper block 22 when the bumper block assembly 20 is impacted upon docking of the trailer 10, and in instances when the bumper block assembly 20 undergoes repeated impact and vertical dock rubbing during the loading and unloading of cargo to and from the storage container 11 of the trailer 10 when the trailer 10 is docked, for example.

As shown in FIGS. 2-5, the outer cap 24 includes a curved outer wall 44 defining a curved outer surface 46 and an inner surface 48. The inner surface 48 includes a middle area 50 and upper and lower areas 52 which are generally planar and offset forwardly from the middle area 50. As is discussed in greater detail below, the outer surface 36 of the bumper block 22 is engaged with the planar, upper and lower areas 52 of the outer cap 24 during use.

The outer cap 24 further includes top and bottom walls 54, 56 each coupled to respective top and bottom portions of the outer wall 44, and side walls 58 each coupled to the respective right and left side portions of the outer wall 44. Illustratively, the top, bottom, and side walls 54, 56, 58 of the outer cap 24 extend forwardly away from the outer wall 44, as shown in FIGS. 4 and 5 while the outer wall 44 is convex such that the outer surface 46 curves rearwardly. Illustratively, the outer wall 44, top, bottom, and side walls 54, 56, 58 of the outer cap 24 cooperate to define a block-receiving cavity 60 of the outer cap 24 configured to receive at least a portion of the bumper block 22 therein.

The outer cap 24 further includes first and second apertures 62, 64 formed through the outer wall 44 and configured to receive one of the bolts 26 of the assembly 20 therethough. Illustratively, each aperture 62, 64 includes a first portion 66 opening to the outer surface 46 of the wall 44 and which defines a first diameter, and a second portion 68 opening to the inner surface 52 which defines a second diameter smaller than the first diameter. Illustratively, the first diameter is generally sized and configured to be approximately the same as or larger than the head 27 of the bolts 26 while the second aperture is generally sized and configured to be approximately the same as or larger than the shaft 29 of the bolts 26 while remaining smaller than the diameter of the head 27 of the bolts. Accordingly, the bolts 26 are countersunk within the outer wall 44 such that an underside surface of the head 27 of each bolt 26 engages a recessed surface 70 of the outer wall 44 of the outer cap 24. Illustratively, the outer cap 24 is made of steel, but may be made from other suitable materials as well including, for example, plastic, wood, other metals, and/or metal alloys.

In use, as noted above, each bumper block assembly 20 is illustratively coupled to the bumper 12 of the trailer 10 and is positioned outside the brake and turn signal lights 16, 18. However, it should be understood that the bumper block assembly 20 may be coupled to the bumper 12 of the trailer 10 at any suitable location. Further, the bumper block assembly 20 may be coupled to other portions of the trailer 10 as desired. As noted above, for example, one or more bumper block assemblies 20 may be coupled to the bumper 12 inboard of the lights 16, 18 and/or may be coupled to one or more of the vertical legs 15 of the rear underride assembly.

As noted above, the bumper 12 includes the horizontally-extending bar or sill 14 to which the lights 26, 18 are coupled. The sill 14 includes an outer, or rearward, surface 72 and an inner, or forward, surface 74. The bumper block 22 is positioned adjacent to and engaged with the outer surface 72 of the sill 14 such that the forward, inner surface 38 of the bumper block 22 is engaged with the outer surface 72 of the sill 14, as shown in FIGS. 4 and 5. The outer cap 24 is positioned over the bumper block 22 such that at least a portion of the bumper block 22 is received within the cavity 40 of the outer cap 24. Accordingly, the outer surface 36 of the bumper block 22 is engaged with the upper and lower areas 52 of the inner surface 48 of the outer wall 44 of the outer cap 24. Further, top and bottom surfaces 80, 82 of the bumper block 22 are engaged with the inner surfaces 84 of the corresponding top and bottom walls 52, 56 of the outer cap 24. As shown in FIG. 4, the first and second portions 66, 68 of each aperture 62, 64 of the outer cap 24 are aligned with the first and second bores 34 of the bumper block 22.

The bolts 26 are each received through one of the first and second apertures 62, 64 of the outer cap 24 and the corresponding first and second bores 34 of the bumper block 22. Further, the bolts 26 are each received through corresponding first and second apertures 86 formed in the horizontally-extending sill 14 such that a threaded end portion 31 of each bolt 26 is positioned forward of the sill 14. It should be understood that while the illustrative embodiment disclosed herein includes the pair of nuts and bolts 26, 28 that it is within the scope of this disclosure for the bumper block assembly 20 to include any suitable fastener configured to coupled the outer cap 24 and the bumper block 22 to the bumper 12 of the trailer 10.

One of the spacers 32 is received over the threaded end portion 31 of each bolt 26 such that each spacer 32 engages the forward, or inside, surface 74 of the sill 14. One of the springs 30 is received over each spacer 32 such that one end of each spring 30 also engaged the forward surface 74 of the sill 14. A washer 89 is placed over the threaded end portion 31 of each bolt 26, and one of the nuts 28 is threaded onto each bolt 26 in order to secure the bumper block 22 and the outer cap 24 to the sill 14 of the bumper 12. Illustratively, the washer 89 and nut 28 coupled to the distal or threaded end portion of each bolt 26 operate as a spring hub to support one of the ends of the spring 30 associated therewith. The spacer 32 is provided for each bolt 26 in order to prevent the nut 28 from being threaded too tightly onto the bolt 26 during assembly. In other words, the spacers 32 operate to prevent the bumper block 22 and the spring 30 from becoming overly-compressed during assembly.

Illustratively, the bumper block assembly 20 further includes a frame 90 positioned around the perimeter of the outer cap 24 in order to capture the outer cap 24 therein. As is discussed in greater detail below, the frame 90 limits the movement of the outer cap 24 and bumper block 22 to inward compression and outward expansion while operating to prevent up-and-down as well as side-to-side movements of the outer cap 24 and the bumper block 22 relative to the bumper 12. Illustratively, the outer frame 90 includes a top member 92, an outer side member 94, an inner side member 96, and a bottom member 98. Each of the top, bottom, and side members 92, 94, 96, 98 are coupled to the horizontally-extending sill 14 of the bumper 12, as shown in FIG. 5. Illustratively, the members 92, 94, 96, 98 may be welded to the sill 14 of the bumper 12 or may be attached thereto using other suitable fasteners. As shown in FIG. 1, the top and side members 92, 94, 96 are coupled to the rearward surface 72 of the sill 14 while the bottom member 98 is coupled to a bottom end of the sill 14. While the figures of the present disclosure show the illustrative frame 90 disclosed herein, it should be understood, that any suitable frame configured to be positioned around the outer perimeter of the outer cap 24 in order to guide movement of the outer cap 24 as the outer cap is compressed and expanded during use may be used as well. Such a frame may include any suitable top, bottom, inner, and/or outer side members of any particular shape or size which are coupled in any suitable manner to the sill 14, to other portions of the bumper 12, or to other portions of the trailer 10 in the event that the bumper block assembly 20 is to be located on other portions of the trailer 10.

In operation, during rearward docking of the trailer 10 when the trailer 10 is being backed up to a stationary dock having an opening therein, the rear bumper 12 of the trailer 10 impacts and engages the vertical surface (not shown) of the dock. The bumper block assembly 20 of the present disclosure operates to absorb some of the shock of the impact between the trailer 10 and the dock and also operates to protect the bumper 12 of the trailer 10 from damage during docking. When the outer wall 44 of the outer cap 24 engages the dock, the outer cap 24 moves forwardly (relative to the trailer 10) to compress the bumper block 22 and absorb some of the force of the impact between the trailer 10 and the dock. As noted above, the frame 90 guides the movement of the outer cap 24 and the bumper block 22 during compression of the bumper block 22. As shown in FIG. 5, as the outer cap 24 and the bumper block 22 move forwardly (to the right, as shown in FIG. 5), the springs 30 on the bolts 26 operate to maintain tension between the wall 14 of the bumper 12 and the nut 28 on the end of each bolt 26 in order to maintain the head 27 of each bolt 26 within the first portion 66 of the respective aperture 62, 64 of the outer cap 24 through which each is received. In other words, the springs 32 operate to keep the heads 27 of the bolts 26 countersunk within the outer cap 24 in order to prevent the bolts 26 from extending rearwardly beyond the outer surface 46 of the outer cap 24 when the bumper block 22 is compressed and the outer cap 24 is moved forwardly toward the storage container 11 of the trailer 10. Thus, the head 27 of each bolt 26 is biased to remain within the recess, or first portion 66, of the respective aperture 62, 64 in order to prevent the head 27 of each bolt 26 from impacting the dock and potentially being damaged.

During impact between the dock and the bumper block assembly 20, the outer cap 24 operates to protect the bumper block 22 from rubbing wear and tear which might otherwise occur between the bumper block 22 and the dock in order to extend the life of the bumper block 22. Illustratively, the curvature of the outer surface 46 of the outer wall 44 of the outer cap 24 operates to prevent the outer cap 24 from snagging any portion of the dock during vertical movements of the trailer 10 relative to the dock which may occur when, for example, forklifts enter or exit the storage container 11 of the trailer 10 in order to load and unload cargo to and from the storage container 11 and/or when the front of the storage container 11 of the trailer 10 is raised or lowered during pick-up or dropping. Further, as noted above, the frame 90 of the bumper block assembly 20 operates to prevent up-and-down as well as side-to-side movement of the outer cap 24 and the bumper block 22 relative to the bumper 12 in order to limit the movement of the outer cap 24 and the bumper block 22 to inward and outward movement. As such, during use, the outer cap 24 and the bumper block 22 are movable between a first, expanded position shown in FIG. 4 and a second, compressed position shown in FIG. 5. In the second, compressed position, the outer cap 24 is moved forwardly (to the right, as shown in FIG. 5) from its location when the bumper block assembly 20 is in the expanded position, the bumper block 22 is compressed, and the springs 30 located forward of the horizontally-extending sill 14 are expanded from their position shown in FIG. 4 such that a distance between the sill 14 and the nut 28 associated with each bolt 26 is greater when the bumper block assembly 20 is in the compressed position shown in FIG. 5 than when the bumper block assembly is in the expanded position shown in FIG. 4.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A bumper block assembly configured to be coupled to a bumper or underride assembly of a trailer comprising:
    a compressible bumper block or spring assembly configured to be coupled to the bumper of the trailer, the bumper block including a generally horizontal bore extending from an outer surface of the bumper block to an inner surface of the bumper block;
    an outer cap coupled to the bumper block, the outer cap including an outer wall engaged with the outer surface of the bumper block and having an aperture formed therethrough that is aligned with the bore of the bumper block;
    a fastener received through the aperture of the outer cap and the bore of the bumper block; and
    a spring positioned around an end portion of the fastener in order to maintain a head end of the fastener recessed within the aperture of the outer cap as the outer cap and bumper block are moved between expanded and compressed positions,
    wherein the entire spring is positioned forward of the bumper block.

2. The bumper block assembly of claim 1, wherein the fastener is configured to be received through an aperture in the bumper of the trailer.

3. The bumper block assembly of claim 1, wherein the spring is spaced-apart from the outer cap.

4. The bumper block assembly of claim 1, wherein the outer surface of the outer wall is curved outwardly.

5. The bumper block assembly of claim 1, wherein the outer cap further includes a top wall, a bottom wall, and spaced-apart side walls each coupled to the outer wall in order to define a bumper block-receiving cavity therein, and wherein a portion of the bumper block is received within the cavity.

6. The bumper block assembly of claim 5 wherein the bumper block is engaged with the top, bottom, and side walls of the outer cap.

7. The bumper block assembly of claim 5, wherein the spring is positioned outside the bumper-receiving cavity.

8. The bumper block assembly of claim 1, wherein a distance between first and second ends of the spring is greater when the outer cap and the bumper block are in the compressed position than when the outer cap and the bumper block are in the expanded position.

9. The bumper block assembly of claim 1, further comprising an outer frame configured to be coupled to the bumper of the trailer in order to guide movement of the outer cap between compressed and expanded positions of the bumper block.

10. The bumper block of claim 9, wherein the outer frame includes top, bottom, and side walls each configured to be coupled to the bumper of the trailer and each engaged with the corresponding top, bottom, and side walls of the outer cap.

11. A bumper block assembly configured to be coupled to a bumper or underride assembly of a trailer comprising:
    a compressible bumper block or spring assembly configured to be coupled to the bumper of the trailer, the bumper block including a generally horizontal bore extending from an outer surface of the bumper block to an inner surface of the bumper block;
    an outer cap coupled to the bumper block, the outer cap including an outer wall engaged with the outer surface of the bumper block and having an aperture formed therethrough that is aligned with the bore of the bumper block;
    a fastener received through the aperture of the outer cap and the bore of the bumper block;
    a spring positioned around an end portion of the fastener in order to maintain a head end of the fastener recessed within the aperture of the outer cap as the outer cap and bumper block are moved between expanded and compressed positions; and
    a spacer positioned around an end portion of the fastener, wherein the spring is positioned around the spacer, and further wherein a rearward end of the spacer is configured to engage a forward surface of the bumper and a forward end of the spacer is engaged with a spring hub coupled to the end portion of the fastener.

12. A rear bumper of a vehicle such as a trailer comprising:
a horizontal wall of the rear bumper of the vehicle;
a bumper block assembly coupled to the horizontal wall of the rear bumper, the bumper block assembly including:
  (i) a bumper block engaged with a rearward surface of the wall,
  (ii) an outer wall engaged with a rearward surface of the bumper block when the bumper block is in both compressed and expanded positions, wherein an outer surface of the outer wall is curved outwardly,
  (iii) a fastener received through the outer wall, the bumper bock, and the horizontal wall of the bumper, and
  (iv) a spring positioned around a distal end of the fastener wherein a first end of the spring is engaged with the forward surface of the horizontal wall of the bumper and a second end of the spring is engaged with a spring hub on the distal end of the fastener.

13. The assembly of claim 12, wherein the outer wall includes a recess formed therein, and wherein a head of the fastener is positioned within the recess.

* * * * *